United States Patent [19]

Killian

[11] Patent Number: 4,900,918

[45] Date of Patent: Feb. 13, 1990

[54] RESONANT FIBER OPTIC ACCELEROMETER WITH NOISE REDUCTION USING A CLOSED LOOP FEEDBACK TO VARY PATHLENGTH

[75] Inventor: Kevin M. Killian, Hackensack, N.J.

[73] Assignee: Allied-Signal Inc., Morris Township, Morris County, N.J.

[21] Appl. No.: 82,255

[22] Filed: Aug. 6, 1987

[51] Int. Cl.⁴ .......................... H01J 5/16; G01D 5/34
[52] U.S. Cl. ................................ 250/227; 250/231 R; 250/231 P
[58] Field of Search ............... 250/227, 231 R, 231 P; 73/517, 518; 356/345

[56] References Cited

U.S. PATENT DOCUMENTS 4,454,418 6/1984 Walker ........................... 250/231 R
4,613,752 9/1986 Davis ............................. 250/231 R Primary Examiner—David C. Nelms
Assistant Examiner—Stephone B. Allen
Attorney, Agent, or Firm—Howard G. Massung

[57] ABSTRACT

A pair of resonant optical cavities are used to measure shifts in length of a beam which deflects under acceleration. One end of each optical cavity is highly reflective and the other end partially reflective, thus permitting resonating light to exit the resonators. The light outputs of the two resonators is combined and the resultent beat frequency is used to detect deflections of the beam.

12 Claims, 1 Drawing Sheet

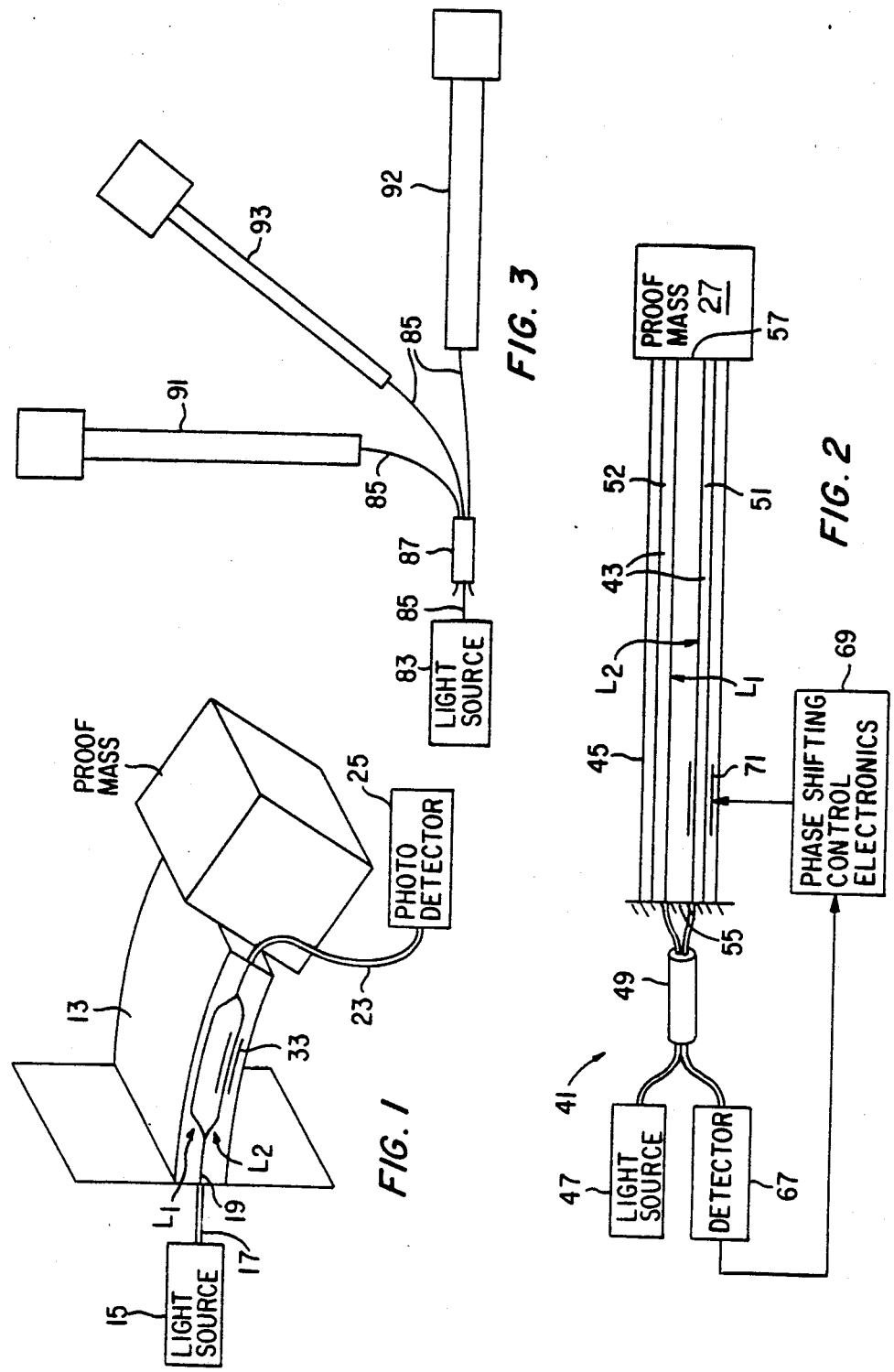

RESONANT FIBER OPTIC ACCELEROMETER WITH NOISE REDUCTION USING A CLOSED LOOP FEEDBACK TO VARY PATHLENGTH

FIELD OF THE INVENTION

This invention relates to rate instruments such as accelerometers. More particularly it relates to an optical resonator used to measure acceleration.

BACKGROUND OF THE INVENTION

A beam that is rigidly mounted at one end with a proof mass (accurately measured mass) at the other end will bend in accordance with Hooke's Law, when subjected to an acceleration in a direction orthogonal to the beam. If these bending deflections are measured, then the assembly can be used as an acceleration measuring device. Optical measurements have in hereof advantages wherein highly accurate measurements can be obtained with very little deviation over the lifetime of the measuring device.

SUMMARY OF THE INVENTION

A beam suspending a proof mass has plural light paths thereon in a resonator configuration. The integrated optics waveguide pattern on the side of the beam causes light to be split into two waves prior to being launched into the integrated optics waveguide. The waveguide pattern is simply two straight waveguides which are partially reflective at one end of the beam and highly reflective at the other end. Two ports of a 2×2 fiber directional coupler are attached to the two partially reflective ends, and light is launched into one of the other ports. A photodetector is attached to the remaining coupler port.

With this architecture, two resonant cavities are set up in the beam. When the beam is in the unbent condition, the optical frequencies which resonate in both resonant cavities are the same or have a baseline relationship. With the application of an acceleration, the beam becomes bent out of shape and the optical pathlengths become different, and thus there is a different resonant frequency associated with each. If the light source is broadband enough to contain a resonant frequency of both waveguides, then the largest portions of the optical powers contained in the waveguides will be at the resonant frequency and wavelength. A portion of the waves in the two waveguides will pass through one end and be launched back into a coupler. When these two beams are recombined in the coupler, the resultant signal will oscillate at the frequency which is the difference ("beat" frequency) between the two resonant frequencies. This beat signal is translated to a digital output whose pulse rate is proportional to acceleration The beat output does not inherently give information concerning the direction of the acceleration, but if the device is originally calibrated with a known acceleration and direction, then a 180 degree phase shift of the oscillations will be noticed every time the direction of the acceleration changes. Noting this shift will indicate the direction of the acceleration. An alternative method is to use some sensitive (but not necessarily accurate) deflection measuring device to supply information on the direction of the acceleration, such as a strain gage, or position measurement of the proof mass.

The resonant accelerometer can also be used in the closed loop feedback mode. In this case, a phase shifter can be included in one of the waveguides. Instead of using an oscillating signal on the shifter, a dc signal will be used. The phase shifter can vary the optical pathlength of one of the waveguides, and therefore can be used to equalize the two pathlengths which have been made unequal by the acceleration input. A unique voltage is required to vary the index in the phase shifter region so that no beat frequency appears at the output. A feedback loop may be constructed to achieve this condition, and the voltage to the shifter will be a measure of the acceleration. In the linear region of the shifter, the output voltage will be directly proportional to the optical pathlength difference.

Similar integrated optics configurations may be placed on the opposite side of the beam, for redundant measurement, and on the other two sides of the beam, for detection of accelerations in the orthogonal direction.

BRIEF DESCRIPTION OF THE DRAWINGS

FIG. 1 shows an interferometric accelerometer constructed in accordance with one embodiment of the invention;

FIG. 2 shows a resonant optic accelerometer constructed in accordance with a different embodiment of the invention; and FIG. 3 shows a three axis optic accelerometer using the inventive technique.

DETAILED DESCRIPTION OF THE PREFERRED EMBODIMENTS

A bending beam 13 with interferometic optical deflection measurement is shown in FIG. 1. Light is sent from a light source 15, through an optical fiber 17, and into an integrated optic waveguide 19. The integrated optic waveguide 19 is diffused into the beam 13. The beam is preferrably made of some substrate material, typically lithium niobate, and the waveguides are produced by diffusing another material into the substrate. A preferred material for diffusion into lithium niobate is titanium.

Once in the integrated optics 19, the light is split into two parts, and these parts travel through optical pathlengths $L_1$ and $L_2$. The two light waves then recombine, and travel through another optical fiber 23 to a photodetector 25. A proof mass 27 is fixed to a free end of the beam 13.

When the two beams recombine, they interfere. This means that the power on the detector follows the relation:

$$P_{det} = P_1 + P_2 + 2(P_1 P_2)^{\frac{1}{2}} \cos(2\pi(L_1 - L_2)/\lambda) \quad (1)$$

where:

$P_1$ is the power of the beam in $L_1$ $P_2$ is the power in $L_2$ $\lambda$ is the wavelength of the light source Equation (1) shows that the optical output changes with the length difference between $L_1$ and $L_2$.

The optical pathlength difference between $L_1$ and $L_2$ will change with the bending of the beam, which affects both the physical length and refractive index of the waveguide 19. Since the beam bends 13 with acceleration, the power to the photodetector 25 can be used to measure the acceleration on the proof mass/beam system 13, 27.

Since there exist phenomena, not related to acceleration, which could cause variation in the output power, it is useful to insert a phase modulator 33 into one of the legs of the interferometer. Phase modulation encodes the signal to be detected by the photodetector 25, by causing the light to oscillate at a preferred frequency. If pertubations occur at a different frequency, then such perturbations would not appear at a demodulated output. This technique, which is similar to radio homodyning, results in measurements being limited to interferometric measurements.

Looking at equation (1), the third term is proportional to the cosine of $(2\pi(L_1-L_2)/\lambda)$. More specifically, the third term is proportional to the cosine of the shift in length, $L_1-L_2$. By modulating the light output sinusoidally, the third term becomes effectively proportional to the sine of the shift in length for all values of $L_1-L_2$ which are small compared to $L_1$ or $L_2$. This is, of course, a more favorable situation for precise measurements because most measurements will be from a small argument wherein the relative change in the sine term would be much greater than the change in the cosine term.

A typical location of the phase modulator 33 is shown in FIG. 1.

A second manifestation of an integrated optics interferometer 41 is the resonator configuration shown in FIG. 2. In this case, the integrated optics waveguide pattern 43 which is diffused into the side of a beam 45 is slightly different. In this case, the light from a source is split by a 2×2 fiber directional coupler 49 into two waves prior to being launched into the integrated optic waveguide 43. The waveguide pattern is simply two straight waveguides 51, 52 which are partially reflective at one end of the beam 41 and highly reflective at the other end 57. Two ports of the directional coupler 49 are attached to the two waveguides 51, 52 at the partially reflective end 55, and light is launched into one of the other ports. A photodetector 67 is attached to the remaining coupler 49 port.

With this architecture, two resonant cavities are set up in the beam. One of the cavities is defined by waveguide and the other cavity by waveguide 52. When the beam 45 is in an unbent condition, the optical frequencies which resonate in both cavities 51, 52 are the same or have a baseline ratio. With the application of an acceleration, beam 45 bends and the optical pathlengths of the cavities 51 and 52 become different (as with the interferometer). Thus there is a different resonant frequency associated with each. If the light source is broadband enough to contain a resonant frequency of both waveguides, then the largest portions of the optical powers contained in the waveguides will be at the resonant frequency and wavelength. A portion of the waves in the two waveguides 51, 52 will pass through the partially reflective end 45 and be launched back into the coupler 49. When these two beams are recombined in the coupler 49, the resultant signal will oscillate at the frequency which is the difference between the two resonant frequencies ("beat" frequency). This beat signal is sent to the photodetector 67 and electronics 69, which translate the oscillating output of the photodetector 67 to a digital output whose pulse rate is proportional to acceleration.

The beat output does not inherently give information concerning the direction of the acceleration, but if the device is originally calibrated with a known acceleration and direction, then a 180 degree phase shift of the oscillations will be noticed every time the direction of the acceleration changes. Noting this shift will indicate the direction of the acceleration. An alternative method is to use some sensitive (but not necessarily accurate) deflection measuring device to supply information on the direction of the acceleration (strain gages on beam, position measurement of proof mass, etc.).

The resonant accelerometer 41 can also be used in the closed loop feedback mode. In this case, a phase shifter 71 can be included in one of the waveguides 51. Instead of using an oscillating signal on the shifter 71, a DC signal will be used. The phase shifter 71 can vary the optical pathlength of the waveguide 51, and therefore can be used to equalize the two pathlengths 51, 52 which have been made unequal by the acceleration input. A unique voltage is required to vary the index in the phase shifter region so that no beat frequency appears at the photodetector 67 output. A feedback loop may be constructed to achieve this condition, and the voltage to the shifter 71 will be a measure of the acceleration. In the linear region of the shifter 71, the output voltage will be directly proportional to the optical pathlength difference ($\Delta$ length $L_{51}$, $L_{52}$)

FIG. 3 shows a three axis accelerometer 81 constructed in accordance with the inventive techniques. In the embodiment shown, a single light source 83 is connected through fibers 85 through a 3×3 coupler 87 to three accelerometer sensors 91-93. Accelerometer sensor 91 responds to accelerations along the X axis; sensor 92 responds to accelerations along the Y axis; and sensor 93 responds to accelerations along the Z axis. The use of this arrangement is also suitable for use with interferometer gyroscopes because the outputs of each sensor 91-93 can be detected separately.

What is claimed is:

1. Accelerometer is which a proof mass is suspended by a cantilever beam, and deflection of the beam is proportional to acceleration, characterized by: two resonant light paths, the light paths being rendered unequal in length by the deflection of the beam;
   a common light source connected to the light paths;
   a means to obtain optical outputs representative of light resonating in each of the light paths;
   means to merge the optical outputs;
   photodetection means responsive to the merged optical outputs and sensitive to changes in the character of light as a result of said unequal path lengths; and
   a feedback loop including first means in one of the light paths and second means connected to the first means and to the photodetection means, said first means varying the length of the one light path to equalize the lengths of the two light paths which have been rendered unequal by the acceleration, said second means applying a signal to the first means commensurate with said acceleration.

2. Accelerometer as described in claim 1, further characterized by:
   each of said light paths including at least two reflective surfaces, the distance between the reflective surfaces being the equal to resonant length of that light path.

3. Accelerometer as described in claim 2, further characterized by:
   means to transmit a portion of light from within each resonant light path to outside of the resonant light path so as to be provided to the photodetection means.

4. Accelerometer as described in claim 3, further characterized by:

the light source being connected to each of the light paths through the means to transmit.

5. Accelerometer as described in claim 3, further characterized by:
    each of the light paths having a partially reflective mirror as one of the reflective surfaces; and
    the means to transmit including said partially reflective mirror.

6. Accelerometer as described in claim 4, further characterized by:
    the light source being connected to each of the light paths through the means to transmit.

7. Accelerometer as described in claim 5 further characterized by:
    a phase modulator in at least one of the light paths; and
    means to control the phase modulator.

8. Accelerometer as described in claim 7, further characterized by:
    the means to control the phase modulator responsive to the photodetection means in order to maintain a fixed frequency relationship between said light paths by phase modulating said one light path.

9. Accelerometer as described in claim 8, further characterized by:
    means to sense a reversal of phase in the character of light, the sensed reversal of phase providing as indication of direction of acceleration.

10. Accelerometer as described in claim 8, further characterized by:
    said unequal light paths being sufficient to bias a beat frequency, generated by the merged light outputs, beyond an anticipated range of sensed acceleration.

11. Accelerometer as described in claim 8, further characterized by:
    a further sensor sensing the same deflection as said plurality of light paths, the further sensor resolving ambiguities with respect to opposite deflections of the beam.

12. Accelerometer as described in claim 9, further characterized by:
    the further sensor being a strain gauge.

* * * * *